United States Patent
Guilley et al.

(10) Patent No.: US 11,604,651 B2
(45) Date of Patent: Mar. 14, 2023

(54) METHODS AND DEVICES FOR HARDWARE CHARACTERIZATION OF COMPUTING DEVICES

(71) Applicant: SECURE-IC SAS, Cesson-Sevigne (FR)

(72) Inventors: Sylvain Guilley, Paris (FR); Adrien Facon, Paris (FR); Sébastien Carre, Sceaux (FR)

(73) Assignee: SECURE-IC SAS, Cesson Sevigne (FR)

( * ) Notice: Subject to any disclaimer, the term of this patent is extended or adjusted under 35 U.S.C. 154(b) by 134 days.

(21) Appl. No.: 15/734,548

(22) PCT Filed: May 24, 2019

(86) PCT No.: PCT/EP2019/063441
§ 371 (c)(1),
(2) Date: Dec. 2, 2020

(87) PCT Pub. No.: WO2019/233784
PCT Pub. Date: Dec. 12, 2019

(65) Prior Publication Data
US 2021/0232395 A1   Jul. 29, 2021

(30) Foreign Application Priority Data
Jun. 6, 2018 (EP) .................................. 18305688

(51) Int. Cl.
*G06F 9/30*  (2018.01)
*G06F 9/445*  (2018.01)
*G06F 11/34*  (2006.01)

(52) U.S. Cl.
CPC ........ *G06F 9/3009* (2013.01); *G06F 9/44505* (2013.01); *G06F 11/3409* (2013.01)

(58) Field of Classification Search
CPC ........ G06F 21/55; G06F 21/73; G06F 21/552; G06F 21/554; G06F 9/3009; G06F 9/44505; G06F 11/3409
USPC ......................................................... 702/182
See application file for complete search history.

(56) References Cited

U.S. PATENT DOCUMENTS

| | | | |
|---|---|---|---|
| 2008/0104595 A1* | 5/2008 | Kawachiya | G06F 9/3004 718/100 |
| 2009/0292903 A1* | 11/2009 | Henry | G06F 21/14 712/220 |
| 2019/0042868 A1* | 2/2019 | Oesterreicher | G06T 7/55 |

* cited by examiner

*Primary Examiner* — John H Le
(74) *Attorney, Agent, or Firm* — BakerHostetler

(57) ABSTRACT

A machine characterization device for determining one or more machine characterization parameters of a computing device depending on a machine signature determined from sets of timing measurements associated with at least one machine characterization instruction executed by one or more processors comprised in the computing device using at least two machine configurations. A machine configuration comprises a sequence of two or more machine configuration instructions defining an order of execution of one or more instructions by the one or more processors.

12 Claims, 2 Drawing Sheets

METHODS AND DEVICES FOR HARDWARE CHARACTERIZATION OF COMPUTING DEVICES

CROSS-REFERENCE TO RELATED APPLICATIONS

This application is a National Stage of International patent application PCT/EP2019/063441, filed on May 24, 2019, which claims priority to foreign European patent application No. EP 18305688.6, filed on Jun. 6, 2018, the disclosures of which are incorporated by reference in their entirety.

TECHNICAL FIELD

The invention generally relates to computing systems and in particular to systems, methods, and computer program products for hardware characterization and type detection of computing devices.

BACKGROUND

The power consumption and the processing time of modern computing devices highly vary, mainly depending on the hardware resources available in the computing devices and softwares on board. The hardware resources can be represented by a number of parameter such as the type and the size of cache memories, as well as the type and the performance of the processing elements.

Detecting the type of a given machine (or "computing device") can enable identifying the hardware resources available for the machine, such as the number of processors, the number of hardware threads, the number of cores, the main memory and cache memory sizes and types, and the processor type/family model.

Machine type detection can be useful also for many performance and security purposes, for example for determining if a computing device meets system requirements, checking compatibility for upgrades, comparing a computing device to another, checking hardware specifications for selling a computing device, ensuring that software is not running on an undesirable machine, etc.

There exist solutions for detecting if software is running on a virtual machine. A solution consists in populating the iTLB and executing an instruction that has to be caught by a hypervisor. If the software runs in a virtual machine, the hypervisor will necessary pollute the iTLB. After executing the instruction, the software running on a virtual machine can detect the iTLB was pollute.

Such solutions enable detecting if softwares are running on the appropriate dedicated selected machine. However, such solutions cannot be used to perform machine type detection.

There is accordingly a need for devices and methods for determining hardware specifications of computing devices.

SUMMARY

In order to address these and other problems, there is provided a machine characterization device for determining one or more machine characterization parameters of a computing device. The computing device comprises one or more processors, each processor being configured to execute one or more instructions. The machine characterization device comprises:

a storage unit configured to store at least one machine characterization instruction and at least two machine configurations, a machine characterization instruction being an instruction associated with a timer for measuring the time of execution of the machine characterization instruction, a machine configuration comprising a sequence of two or more machine configuration instructions defining an order of execution of the one or more instructions by each processor, and a processing unit configured to:
determine, in association with each machine characterization instruction executed by the one or more processors, a set of timing measurements measuring, using the timer, the time of execution of the machine characterization instruction;
determine a machine signature from the sets of timing measurements associated with at least one machine characterization instruction executed by the one or more processors using each of the at least two machine configurations, and
determine one or more machine characterization parameters depending on the machine signature.

According to some embodiments, a machine configuration instruction may be chosen in a group consisting in memory barriers instructions and serialization instructions, a memory barrier instruction being one of a load barrier instruction or a store barrier instruction or a full barrier.

According to some embodiments, the computing device may further comprise a main memory and at least one processor cache, the main memory and the at least one processor cache being configured to store data and/or instructions. In such embodiments, a machine characterization instruction may be chosen in a group consisting in a data cache read instruction for reading data from the at least one processor cache, an instruction cache read instruction for reading one or more instructions from the at least one processor cache, a data cache write instruction for writing data on the at least one processor cache, a cache suppress instruction for suppressing at least a part of data and/or instructions stored in the at least one processor cache, and a main memory write instruction for writing data on the main memory.

In some embodiments in which the main memory is a dynamic random access memory, a machine characterization instruction may be an instruction that provides a minimum memory refresh period, a memory refresh operation consisting in reading information from at least a part of the main memory and rewriting the read information to at least a part of main memory without modification of the information, a memory refresh period representing a time period between each two memory refresh operations.

In some embodiments, the processing unit may be configured to determine the machine signature by:

determining, in association with each of the at least one machine characterization instruction executed for each of the at least two machine configurations a mean value and a dispersion value. The mean value represents the mean of the set of timing measurements associated with the at least one machine characterization instruction. The dispersion value represents a statistical dispersion of the set of timing measurements;

determining, in association with each of the at least one machine characterization instruction, a difference of means value and a difference of dispersions value. The difference of means value represents the difference between the mean values determined for the at least two machine configurations. The difference of dispersions value represents the difference between the dispersion values determined for the at least two machine configurations.

In such embodiments, the processing unit may be configured to determine the machine signature as a binary representation of the mean value, the dispersion value, the difference of means value, and the difference of dispersions value associated with the at least one machine characterization instruction.

According to some embodiments, a machine characterization parameter may be chosen in a group consisting in a number of processors, a number of cores, a main memory type, a cache memory type, a number of cache levels, a main memory size, a cache memory size, and a processor type/family model.

According to some embodiments, a main memory type may be chosen in a group consisting in volatile memories and non-volatile memories, volatile memories comprising a random access memory, a static random access memory, a dynamic random access memory, a synchronous dynamic random access memory, a double data rate synchronous dynamic random access memory, a thyristor random access memory, and a zero capacitor random access memory, non-volatile memories comprising a read only memory, a programmable read only memory, an erasable programmable read only memory, an electrically erasable programmable read only memory, a non-volatile random access memory, a magnetic random access memory, and a Ferroelectric random access memory.

In some embodiments, a processor type/model may be chosen in a group consisting in AMD Sempron processor, AMD Athlon 64 processor, AMD Athlon 64×2 processor, AMD A series processor, Intel Atom processor, Intel Itanium processor, Intel Xeon processor, Intel core i3 processor, Intel core i5 processor, Intel core i7 processor, Intel Pentium 4 processor, Intel Pentium D processor, and Intel Pentium Dual core processor.

According to some embodiments, the processing unit may be configured to determine the one or more machine characterization parameters (online) depending on the machine signature with respect to a set of predefined machines signatures (previously determined offline), each predefined machine signature being associated with one or more predefined machine characterization parameters.

According to some embodiments, the processing unit may be configured to determine the one or more machine characterization parameters periodically or at specific time from machine characterization parameters previously determined during a machine learning phase from the execution of at least one machine characterization instruction for at least two machine configurations.

In some embodiments, the machine characterization device may be implemented within the computing device.

In other embodiments, the machine characterization device and the computing device may be remote, the computing device being a cloud computing device hosted in a cloud computing platform.

There is also provided a method for determining one or more machine characterization parameters of a computing device, the computing device comprising one or more processors, each processor being configured to execute one or more instructions. The method comprises:

receiving at least one machine characterization instruction and at least two machine configurations, a machine characterization instruction being an instruction associated with a timer for measuring the time of execution of the machine characterization instruction, a machine configuration comprising a sequence of two or more machine configuration instructions defining an order of execution of the one or more instructions;

determining, in association with each machine characterization instruction executed by the one or more processors, a set of timing measurements measuring, using said timer, the time of execution of the machine characterization instruction;

determining a machine signature from the sets of timing measurements associated with at least one machine characterization instruction executed for each of the at least two machine configurations, and determining one or more machine characterization parameters depending on the machine signature.

Advantageously, the embodiments of the invention enable detecting if software is running on the intended machine or on an undesirable machine that can be insecure or inappropriate (for example belonging to another entity that can be malicious, situated in a country where laws are not compatible with it for instance).

Advantageously, embodiments of the invention further enable detecting if software is running in a virtualized environment in a user space.

Advantageously, embodiments of the invention provide efficient performance and security validation tools enabling checking hardware specifications of computing devices, determining if a computing device meets system requirements, checking compatibility for upgrades, and comparing a computing device to another.

Further advantages of the present invention will become clear to the skilled person upon examination of the drawings and the detailed description, provided for illustration purposes only.

BRIEF DESCRIPTION OF THE DRAWINGS

The accompanying drawings, which are incorporated in and constitute a part of this specification, illustrate various embodiments of the invention, together with the general description of the invention given above and the detailed description of the embodiments given below.

DETAILED DESCRIPTION

Figure 1:
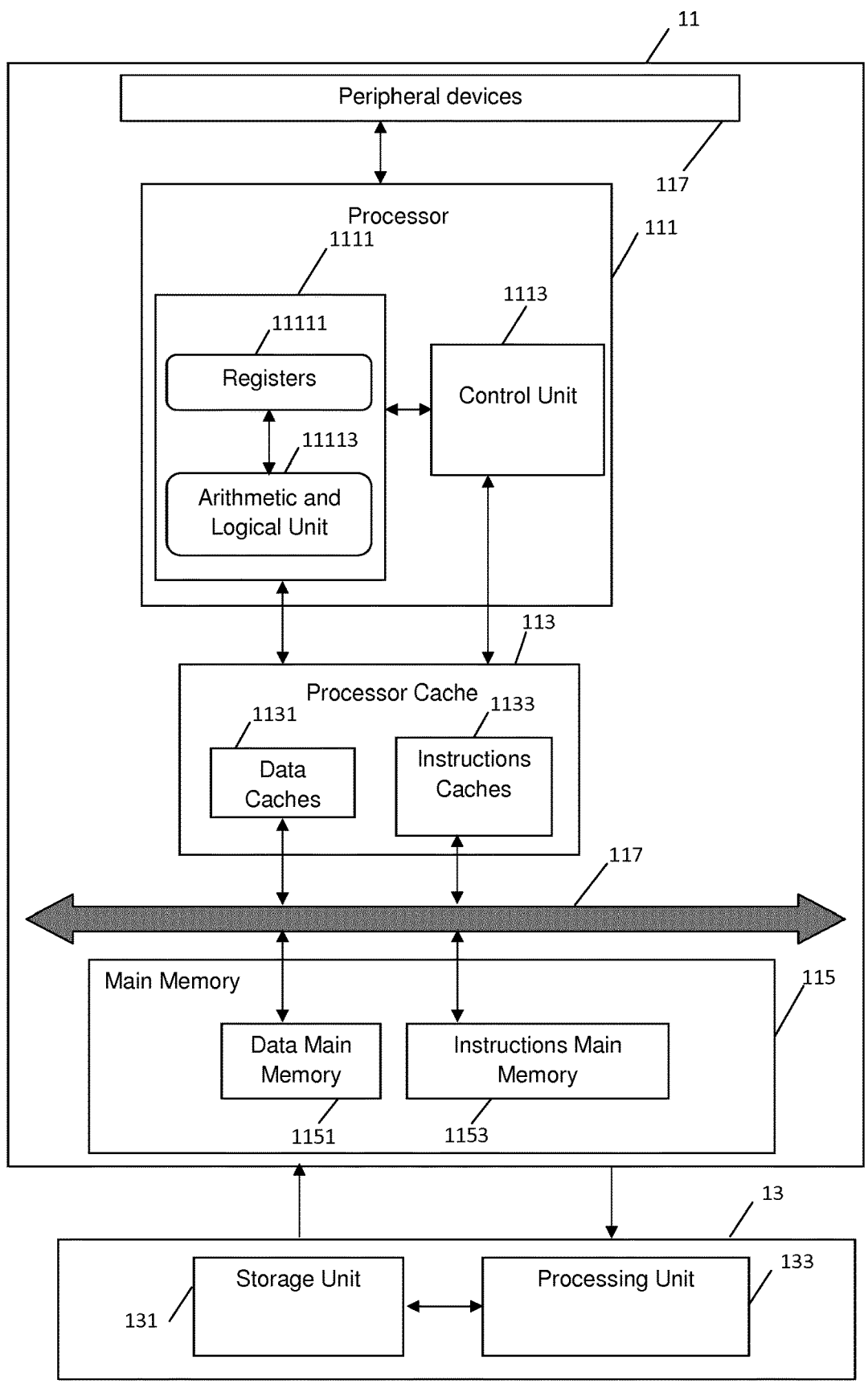
FIG. 1 is a block diagram illustrating the structure of a computing device, according to some embodiments of the invention.

Embodiments of the present invention provide devices and methods for detecting the type of a computing device, by determining one or more machine characterization parameters using memory timing characteristics (such as cache and DRAM timing characteristics) and/or row-hammer characteristics.

Machine type detection devices and methods according to the various embodiments of the invention may be implemented in a wide variety of industrial, information and consumer devices and systems such as most of electronic devices, including but not limited to laptop, tablet, automotive, planes, IoT devices, or the like.

To facilitate the understanding of the following description of various embodiments of the invention, the following definitions are provided.

As used herein, a computing device (also referred to as hereinafter as 'a machine', or 'a computer', or 'a computing machine') refers to a device programmable and/or programmed to execute programs (also referred to as 'computer programs') stored in memory means.

The term 'program' (or 'software program') refers to a collection of data and instructions that performs a specific task when executed by a processor. The format and semantics of the instructions are defined by the instruction set architecture (ISA). An executing program is referred to as a 'process'. A part or all of a computer program that performs a well-defined task is known as an 'algorithm'. A collection of computer programs, libraries, and related data are referred to as 'software'. The term "software" generally refers to data processing functionality that is deployed on processing devices. Software cannot be used to change or define the hardware characteristics of the device on which it is loaded.

An algorithm is generally considered to be a sequence of operations and/or similar processing leading to a desired result, once executed.

A computer program is usually written in a programming language, manually or not, directly or via dedicated tools. From the program when in its human-readable form of source code, a compiler can derive machine code (a form consisting of assembly instructions) that the computing device can directly execute using one or more processing elements (also referred to as 'a processor'), typically a central processing unit (CPU). Alternatively, a computer program may be interpreted before being executed with the aid of an interpreter.

A program to be executed consists of data and instructions that are stored in memory components. The function of a processing element, regardless of the physical form it takes, is to execute the instructions of a program by performing operations specified by the instructions such as arithmetic, logical, control, and input/output operations.

The operational process performed by a processing element to execute an instruction is known as an 'instruction cycle' (also called a 'fetch-decode-execute cycle') and is based on an 'in-order execution' of the instructions. This process defines the way according to which a processor retrieves an instruction from the memory components, and/or determines the actions dictated by the instruction, and/or carries out those actions.

An instruction usually comprises the following three steps:
  A step of fetching the instruction in which the instruction is fetched from memory components;
  A step of decoding the instruction in which the fetched instruction is interpreted/decoded. If input operands are available, the instruction is dispatched to the appropriate functional unit. If one or more operands are unavailable during the current clock cycle, the processing element stalls until the required operands are available, and
  A step of executing the instruction in which the actions required by the instruction are performed.

Based on such 'in-order execution' process, the instructions are executed according to their order in the program.

Other modern processors use performance optimizations that can result in 'out-of-order execution'. Accordingly, the processing elements execute instructions according to an order governed by the availability of input data and appropriate functional units, rather than by their original order in the program. Using 'out-of-order execution', the processing elements can avoid being idle while waiting for the preceding instruction to complete to retrieve data for the next instruction in the program, processing instead the next instructions that can be run immediately and independently.

Memory operations may be accordingly reordered to optimize processing time. However, this needs to be carefully controlled when many calculations or many processes are carried out concurrently, for example in multi-core and multi-processor computing devices having multiple processing elements within a single chip.

Memory barrier instructions (synchronization instructions) can be used at the hardware level to prevent the reordering of memory operations in an out-of-order execution context. A barrier for a group of threads or processes in the machine code is used to stop any thread/process at the barrier, the execution being prevented from proceeding until all other threads/processes have reached the barrier.

Serializing instructions are instructions that can be used to prevent the out-of-order execution for any kind of operations.

Executed programs are stored in memory means, for instance in the main memory of the computing device.

Computing devices can use high-speed processing elements and a lower-speed main memory. To bridge the gap between the speed of the processing elements and of the main memory, cache memories can be used. Cache memories are fast and small memories, placed between the processing elements and the main memory, that store copies of the data and/or instructions from the frequently used main memory locations so that they are immediately available to the processing elements when needed.

Dynamic random access memories (DRAMs) can be used as main memories in a plurality of computing devices such as desktop computers, smart-phones and servers. In DRAMs, data/instructions are stored in capacitors where only one capacitor and one transistor are required per bit. The capacitor is either charged or uncharged, representing a binary value. The transistor is used to access the stored value.

The time required to access to cache memories generally depend on the memory locations and on the memory levels in cache memories where the memory accesses are performed, as well as on the memory types and technologies used in those memories. For examples, shared cache memories can introduce access latencies when multiple cores try to access the cache in parallel. Access to a dynamic random access memory can be slowed down depending on the refresh time required for charging the capacitors and the maintenance of main memory.

Data and instructions are transferred between the main memory and the cache memories in blocks of fixed size, called 'cache lines' or 'cache blocks'. When a cache line is copied from main memory into the cache, a cache entry is created.

When a processing element needs to read or write a memory location in main memory corresponding to data or instruction request, the processing element may first check for a corresponding entry in the cache. The cache may check for the contents of the requested memory location in any cache lines that might contain that address. If the processor detects that the memory location is in the cache, it is determined that a 'cache hit' has occurred. However, if the processor does not find the memory location in the cache, it is determined that a 'cache miss' has occurred. In case of a cache hit, the processor can immediately read or write the data/instructions in the cache line. For a cache miss, the cache allocates a new entry and copies data/instructions from main memory. The request may be then fulfilled from the contents of the cache. The new cache entry may include the copied data/instructions as well as a part of the requested memory location, called a 'tag'. A tag can be a part of physical of virtual address that is used for the memory location.

Cache memories are generally small regarding their size, in comparison to the main memory capacities. As a result, not all data can be held in the cache. A processing element can accordingly implement a cache replacement policy that decides which data will be kept in the cache and which data is replaced by new data fetched from the main memory. The operation that consists in removing data from a cache memory is referred to as 'a flush'. Several cache replacement policies exist comprising replacement policies used in Intel processors such as Pseudo-Least recently (PLRU), Bimodal Insertion Policy (BIP) or Quad-Age replacement policy, and random replacement policies used in ARM processors.

Caches may be arranged in a hierarchy which can consist of up to three cache levels, denoted by L1 (level 1), L2 (level 2), and L3 (level 3), where L1 is the fastest but also the smallest cache, and subsequent levels increasing in size and latency.

Cache memories and DRAM main memory are prone to memory-based side-channel attacks.

With reference to FIG. 1, there is shown an example of the implementation of the invention for machine type detection of a computing device 11 in a system 100.

The computing device 11 (or 'machine') may be any device, computer, computing machine, or embedded system, programmed and/or programmable to execute programs. Exemplary computing devices 11 comprise without limitations:
- electrical and digital electronic devices (e.g. MP3 players video game consoles, digital cameras, GPS receivers, digital watches, recorders, digital cameras);
- computers (e.g. desktop computers and laptops), tablets;
- routers, switches, printers;
- mobile phones, base stations, relay stations, satellites;
- Internet of Thing (IoT) devices, robots, drones;
- smartcards, Automated Teller Machines (ATM), etc.

The computing device 11 may be used in various application fields comprising, without limitations, digital electronics, communications (e.g. digital, wired, wireless, cellular/radio, optical, satellite, acoustic, and molecular communications), computing networks/systems, data center interconnections, digital data storage, recording (e.g. magnetic and optical recording), data and information processing (e.g. databases, online sale systems, financial systems), positioning systems, digital television and video broadcasting, identity (e.g. electronic passport systems, banking), transportation (e.g. in inertial guidance systems, in GPS receivers, motor controllers, and in electric and hybrid vehicles), medicine (medical equipment, for example in electronic stethoscopes and medical imaging equipments), etc.

The system 100 may be accordingly any information system, data storage and/or processing system, computing system, or communication system.

In an application of the current disclosure to communication systems, the computing device 11 may be fixed or mobile, configured to operate in a wired, wireless, radio, or optical fiber-based communication network.

Further, the computing device 11 may be a standalone device or may be connected to external devices, machines or systems for example in computer networking systems (e.g. small or large area wired or wireless access networks).

In one embodiment, the computing device 11 may be a cryptographic device configured to implement cryptographic mechanisms for ensuring data or signals security, authentication, protection, and/or privacy in a cryptosystem 100.

Regardless of the application and the type of the computing device 11, the main task of a computing device 11 is to carry out, using one or more processors, computer programs stored in memory means 115 (also referred to as memory storage), for example non-volatile memories, Random Access Memories (RAM), flash memories, mass storage such as hard disks, etc.

Memory means are configured to store programs, as well as data. Thus, programs and data may transit from memory means to processor(s) where they can be executed. A program may use memory addresses to execute machine code, store and retrieve data in/from memory means. A memory access request may correspond to an instruction request or to a data request.

As shown in FIG. 1, the computing device 11 may comprise at least one processor 111 (also referred to as 'central processing unit (CPU)') and memory means 115 (also referred to hereinafter as 'main memory'), the processor 111 being configured to execute the computer programs stored in the main memory 115 using one or more processing units 1111 (also referred to as 'cores'). The computing device 11 may comprise memory bus(es) 117, configured to route directly or indirectly (for example via cache memories) data and/or instructions and/or memory addresses between the main memory 115 and the processor 111.

In some embodiments, the processor 111 may be configured to execute the instruction cycles sequentially according to an 'in-order-execution' approach, i.e. each instruction being processed before the next one is started.

Alternatively, in some embodiments, the processor 111 may be configured to execute the instruction cycles concurrently or in parallel using an 'out-of-order execution' approach, the instruction cycles being for example scheduled using an instruction pipeline.

According to some embodiments, the main memory 115 may be chosen in a group comprising volatile memories, non-volatile memories, a combination of both volatile and non-volatile memory units.

In some embodiments, a volatile memory may use one or more of a Random Access Memory, a Dynamic Random Access Memory (DRAM), a Synchronous Dynamic Random Access Memory (SDRAM), a Static Random Access Memory (SRAM), a Thyristor Random Access Memory (T-RAM), and a Zero capacitor Random Access Memory (Z-RAM). Volatile memories are generally advantageous in terms of improving read/write performance, with a lower cost/footprint than non-volatile writable memories.

DRAM may be advantageously used as main memory in a portable computing device, a computer, or a workstation. In DRAM, stored data is continually restored and refreshed.

SRAM may be advantageously used as main memory in embedded devices. In SRAM, stored data does not have to be continually refreshed; data remains static until it is overwritten or is deleted when the power is switched off.

In some embodiments, a non-volatile memory may use one or more of a Mask ROM, PROM, EPROM, EEPROM, NVRAM, Flash memory Solid-state storage, nvSRAM, FeRAM (Ferro-electric RAM), MRAM (Magnetic RAM), PRAM. Non-volatile memories are generally advantageous in terms of providing access to previously stored information upon reboot and/or power cycle.

Further, in some embodiments, the main memory 115 may comprise:
- a data main memory 1151 configured to store data, and
- an instructions main memory 1153 configured to store the instructions of computer programs.

According to some embodiments, the memory locations may correspond to physical addresses.

In some embodiments, the memory locations may correspond to virtual/logical addresses, the computer programs having no knowledge of the physical addresses. In such embodiments, the computing device 11 may comprise a memory management unit (not shown in FIG. 1) configured to store all memory references used for virtual memory management. The memory management unit may be configured to perform the translation of virtual memory addresses to physical addresses. The memory management unit may be configured to handle at the same time memory protection, cache controls, and bus arbitration. Further, the memory management unit may be implemented as part of the processor 111 or as separate integrated circuit outside the processor 111.

In one embodiment, the computing device 11 may comprise a single processor 111 configured to execute one or more instructions comprised in one or more programs.

Alternatively, the computing device 11 may be a multi-processor device, comprising at least two processors 111.

In some embodiments, the processor 111 may be a single core processor, comprising a single processing unit 1111.

In other embodiments, the processor 111 may be a multi-core processor, comprising a plurality of processing units 1111 configured to perform tasks at a given time (as used for example in embedded systems, digital signal processing, or graphic processing units). The tasks may be software processes and/or threads scheduled by the operating system.

In such embodiments, the processor 111 may be a single computing component configured to run multiple instructions on separate cores at the same time, increasing overall speed for program execution amenable to parallel computing. The different cores 1111 may be integrated onto a single integrated circuit die (also known as a chip multiprocessor), or onto multiple dies in a single chip package or on several packages.

Each core may be split into hardware threads that have their own memory registers but may share several units such as logical or arithmetic units.

Further, cores 1111 in a multi-core processor 111 may or may not share memory means (for instance cache memories). In some embodiments, the cores 1111 may be configured to implement message passing or shared-memory inter-core communication methods.

In embodiments in which the computing device 11 is a multi-processor, the computing device 11 may comprise one or more single-core processors and one or more multi-core processors.

Further, in some embodiments in which the computing device 11 comprises a plurality of processors 111, the processors 111 may be centralized in space or distributed in space such as clusters and farms of servers.

According to some embodiments, the computing device 11 may comprise at least one virtual processor 111, a virtual processor being a physical central processing unit that is assigned to a virtual machine (e.g. in cloud computing applications, cloud servers, etc).

As shown in FIG. 1, the processor 111 may comprise:

a processing unit 1111 (that is included in a core) configured to execute the program instruction(s); the processing unit 1111 may comprise an arithmetic and logical unit (ALU) 11113 configured to perform arithmetic and logical operations and processor registers 11111 configured to supply operands to the ALU 11113 and store the results of ALU operations, and a control unit 1113 configured to decode the program instructions and orchestrate/coordinate the fetching (from memory means or storage devices) and execution of instructions by directing the coordinated operations of the ALU 11113, registers 11111 and other components of the computing device 11 (for example peripheral devices 117).

The processor registers 11111 may form small and very fast memory means used to speed the execution of the programs by providing quick access to commonly used values. The processor registers 11111 may in particular comprise specific internal registers-registers, not accessible by instructions and used internally for processor operations only, including:

a program counter, also known as "instruction register" (not shown in FIG. 1): a program counter may indicate the position of the processor 111 in its instruction sequence. A program counter may be configured to hold either the address of the instruction being executed or the address of the next instruction to be executed, depending on the specific system;

memory address register(s) (not shown in FIG. 1) configured to store the memory address from which data will be fetched to the processor 111 (i.e. the memory location of the data to be loaded from memory means to the processor 111) or the address to which data will be sent for storage (i.e. the memory location in which data will be stored), and memory data register(s) (not shown in FIG. 1) configured to store data fetched/retrieved from memory means (retrieved from the processor cache 113 or from memory means 115) and ready to be processed or data waiting to be stored in other memory means (for example in main memory 115).

The memory address register(s) and the memory data register(s) may be related to the fetching of information from other memory means (for example from main memory 115). When reading from memory means, the requested data whose memory address is indicated by the memory address register(s) may be fed into the memory data register(s) and then used by the processor 111. When writing to memory, the processor 111 may write data from the memory data register to the memory location whose address is stored in the memory address register.

In order to speed up the processing of programs by the processor(s) 111 and reduce the average cost (time and/or energy) to access data from the main memory 115, smaller and faster cache memories may be used.

Accordingly, the computing device 11 may comprise a processor cache 113 accessible by the one or more processors 111, closer to the processor core(s) 1111, the processor cache 113 being configured to access the data and/or instructions comprised in the programs to be executed by the one or more processors 111. The processor cache 113 may store copies of the data and/or instructions from frequently requested locations in the main memory 115 so that they are immediately available to the processor(s) 111 when needed. In particular, the data stored in the processor cache 113 may be the result of earlier computations, or the duplicate of data stored elsewhere (for example in main memory 115).

According to some embodiments, the processor cache 113 may be located inside the processor 111 chip (internal cache).

As shown in FIG. 1, the processor cache 113 may be located outside the processor 111 chip (external cache).

In some embodiments, the processor cache 113 may comprise different independent caches, including data cache(s) 1131 and/or instructions cache(s) 1133.

In some embodiments, the processor cache 113 may be organized as a hierarchy of cache levels. The cache levels can be inclusive, non-inclusive or exclusive. For inclusive cache levels, all data that resides in cache levels closer to the core(s) 11111 must also be in this cache level. Exclusive caches guarantee that the data resides only in one cache level. Non-inclusive caches guarantee that the data resides at most in one cache level.

In the embodiments where the processor 111 is a multi-core processor, the low-level cache may be the only cache that may be shared among the different cores. All other cache levels may not be shared. In particular, the last level of the cache hierarchy may be divided into multiple slices, each of the slices belonging to one core and operating as a normal cache. The division of the cache memory into slices may advantageously enable the cores to access the cache memory in parallel, while minimizing the latencies.

According to some embodiments, data may be stored in memory in blocks of fixed sizes (also referred to as 'lines' or 'pages'). Accordingly, the main memory 115 and the processor cache 113 may be divided into pages/lines/blocks of a same length/size. Alternatively, the main memory 115 and the processor cache 113 may be divided into blocks having different sizes.

According to some embodiments, the processor cache 113 may be configured to retrieve/send data from/to the main memory 115, in blocks of cache lines.

When the processor 111 needs to read or write a location in the main memory 115, the processor 111 may first check for a corresponding entry in the processor cache 113. The processor cache 113 may check for the contents of the requested memory location in any cache lines that might contain that address. If the processor 111 finds that the memory location is in the processor cache 113, a cache hit has occurred. However, if the processor does not find the memory location in the processor cache 113, a cache miss has occurred.

In the case of a cache hit, the processor 111 may immediately read or write the data in the cache line.

In case of a cache miss which results in a main memory access, the processor cache 117 may allocate a new entry in the cache and copy data from memory means 15. The new cache entry will include the copied data as well as the requested memory location.

A cache miss may correspond to an instruction read miss, a data read miss, or a data write miss. An instruction cache read miss corresponds to a failed attempt to read instruction(s) from the instructions cache(s) 1133. A data read miss corresponds to a failed attempt to read data from the data cache(s) 1131. A data write miss corresponds to a failed attempt to write data on the data cache(s) 1131.

Further, tagged cache memories may be used. Accordingly, a cache line stored in a processor cache 113 may be divided into a data section containing data fetched from main memory 115 and a tag section which may comprise the address of the actual data fetched from main memory 115. Cache tagging may use physical addresses or virtual addresses.

In some embodiments, the processor cache 113 may be configured to load data from the main memory 115, depending on a cache replacement policy defined at the computing system level. The cache replacement policy may be set such that data migration overheads (such as bandwidth, energy, computing processing, and combinations thereof) are reduced. Accordingly, the amount of data may be previously customized to meet the needs of the processor, application, or combinations thereof.

In one embodiment, the computing device 11 may comprise a secure crypto-processor 111 dedicated for carrying out cryptographic operations to protect sensitive data in memory from hardware and/or software attacks. A crypto-processor 111 may be configured to perform cryptographic mechanisms for encryption, integrity, and replay protection. Advantageously, memory encryption enables protecting the confidentiality of memory-resident data, integrity protection enables preventing an attacker from causing hidden modifications to the encrypted data stored in memory, and replay protection enables eliminating undetected temporal substitution of the encrypted data. Exemplary crypto-processors comprise smartcards used for example in financial transactions, restricted access, telecommunication, military applications, secure communication equipments, Automated Teller machines, TV set-top boxes, etc.

According to some embodiments, memory encryption may be used to protect transferred data and/or instructions between the different storage means (for example between the main memory 115 and the processor cache 113 and/or between the processor cache 113 and the processor 111).

Memory encryption may use one or more encryption mechanisms implementing one or more of error correcting codes (for example Hamming codes, BCH codes), hash functions, and secret key-based cryptographic algorithms (using symmetric or asymmetric keys).

Symmetric encryption algorithms may be chosen in a group comprising DES, 3DES, AES, and RC4.

Asymmetric encryption algorithms may be chosen in a group comprising RSA and ECDSA.

In embodiments in which memory encryption uses one or more secret keys, the secret keys may be previously stored in the computing device 11 (in a centralized or distributed way for example in the main memory 115) or may be generated (online or offline) by a random number generator and/or by Physically Unclonable Function (PUF). In some embodiments, a random number generator may be chosen in a group comprising a pseudo-random number generator and a true random number generator.

In some embodiments, the secret key(s) may be destroyed on reboots and/or on shutdown and initialized (in a deterministic or random way) at the initialization of the processor 111.

In such embodiments, the encryption and decryption algorithms may be chosen based on trade-offs between performance, memory, and the security level required by an application and/or a defined user.

The computing device 11 may further comprise internal and/or external peripheral devices 117 including input devices, output devices, and input/output.

The computing device may have one or more interfaces that allow its use as a peripheral device by desktop computers, although it is not host-dependent in the same way as other peripheral devices. This is for example the case of some computing devices such as digital watches, smartphones and tablet computers.

Input devices may be configured to interact with or send data from the user to the computer. Exemplary input devices comprise keyboards, computer mice, graphic tablets, barcode readers, image scanners, microphones, webcams, game controllers, light pens, and digital cameras.

Output devices may be configured to provide output to the user from the computer. Exemplary output devices comprise computer displays, printers, projectors, computer speakers, webcams.

Input/Output devices may be configured to perform both functions. Exemplary Input/Output devices comprise touchscreens.

The various embodiments of the invention provide efficient machine type detection devices for determining one or more machine characterization parameters related to the computing device 11, based on timing measurements acquired during the execution of specific instructions referred to as machine characterization instructions.

The time required to access instructions and/or data comprised in the computer programs to be executed depends on the type and size of the memory means in which the computer programs are stored. The timing measurements related to memory access requests are used to determine the type of the machine on which the programs are executed, the type of the machine being defined/represented by one or more machine characterization parameters such as the number of the processors, the number of the cores, the type/family model of the processors, and the types and sizes of the memory means accessed during the execution of the instructions comprised in the computer programs, such as the main memory and the cache memories.

The various embodiments of the invention provide efficient machine type detection devices for determining one or more machine characterization parameters related to the computing device 11, based on timing measurements acquired during the execution of specific instructions referred to as machine characterization instructions.

As used herein:
- a 'timer' refers to an instruction that uses the internal clock of the processor 111 to measure the time duration (e.g. in terms of clock cycles, seconds, or fractions of seconds) of execution of an assembly instruction;
- a 'machine characterization' instruction refers to an assembly instruction that is associated with a timer for measuring the time required to execute the machine characterization instruction;
- a 'configuration instruction' refers to an assembly instruction;
- a 'machine configuration' refers to a sequence of two or more configuration instructions that defines a specific state of the computing device 11 and specifies an order according to which the processor(s) execute the instructions comprised in the programs;
- a 'machine characterization parameter' refers to a hardware design parameter that provides a hardware specification on the computing device 11;
- a machine signature refers to a binary sequence representing one or more real-value metrics derived from sets of timing measurements acquired during the execution of one or more machine characterization instructions for two or more machine configurations;

With reference to FIG. 1, there is provided a machine characterization device 13 for determining one or more machine characterization parameters of a computing device 11, the computing device 11 comprising one or more processors 111, each processor 111 being configured to execute one or more instructions comprised in one or more programs. The machine characterization device 13 comprises:
- a storage unit 131 configured to store at least one machine characterization instruction, at least two configuration instructions, and at least two machine configurations, a machine characterization instruction being an instruction associated with a timer for measuring the time of execution of the machine characterization instruction, a machine configuration comprising a sequence of two or more configuration instructions defining an order of execution of the one or more instructions by each processor 111, and
- a processing unit 133.

The processing unit 133 is configured to determine, in association with each machine characterization instruction executed by the one or more processors 111, a set of timing measurements measuring the time of execution of the machine characterization instruction. The set of timing measurements is obtained using the timer associated with the machine characterization instruction.

The processing unit 133 is further configured to determine a machine signature from the sets of timing measurements associated with at least one machine characterization instruction executed by the one or more processors 111 for each of the at least two machine configurations. The processing unit 133 then determines one or more machine characterization parameters depending on the determined machine signature.

The machine configuration instruction may be chosen in a group consisting of serialization instructions and memory barriers instructions.

Serialization instructions are instructions that force the processor to finish modifications/updates to the registers, memory, and flags corresponding to previous instructions and to empty all buffered writes to memory before the next instruction is fetched and executed.

Memory barrier instructions are types of synchronization instructions that force the processor 111 to an ordering of the memory operations such that the processor performs all the operations issued prior to the memory barrier before the operations issued after the memory barrier. Memory barrier instructions enable advantageously controlling the serialization of memory loads and store.

In some embodiments, a memory barrier instruction may be one of a load barrier instruction (e.g. the lfence instruction for x86 processors), a store barrier instruction (e.g. the sfence instruction for x86 processors), or a full barrier (e.g. the mfence instruction for x86 processors).

Using a load barrier instruction, all load instructions after the memory barrier are forced to be performed after the memory barrier.

Using a store barrier instruction, all store instructions prior to the memory barrier are forced to be performed before the barrier and have the store buffers flushed to the processor cache.

A full barrier instruction is a composite of both load and store memory barriers happening on a processor.

A machine characterization instruction may be chosen in a group consisting of:
- a data cache read instruction for reading data from at least one processor cache 113, in particular for reading data from the data cache(s) 1131;
- an instruction cache read instruction for reading one or more instructions from at least one processor cache 113, in particular for reading one or more instructions from the instructions cache 1133;
- a data cache write instruction for writing data on at least one processor cache 113, in particular for writing data on the data cache(s) 1131;
- a cache suppress instruction for suppressing at least a part of data and/or instructions stored in at least one processor cache 113, in particular for suppressing at least a part of data stored in the data cache(s) 1131 and/or suppressing one or more instructions stored in the instructions cache(s) 1133, and a main memory write instruction for writing data on the main memory 115, in particular for writing data on the data main memory 1151.

In one embodiment, the main memory 115 may be a dynamic random access memory, the machine characterization instruction being an instruction that provides a minimum memory refresh period.

In some embodiments, the dynamic random access main memory 115 may comprise a plurality of cells arranged in rows and columns as a matrix. According to this two-dimensional arrangement, reading one cell is equivalent to reading the whole row to which the cell belongs and writing to a cell is equivalent to writing the complete row.

DRAMs are made of capacitors that discharge slowly. The main memory 115 may accordingly comprise a memory controller (not illustrated in FIG. 1) configured to refresh all the cells of the memory periodically by applying a memory refresh operation.

A memory refresh operation thus consists in reading information from at least a part of the main memory 115 and rewriting the read information to at least a part of the main memory 115 without modification of the read information.

A memory refresh period represents a time period between each two memory refresh operations. For example, in the JEDEC (Joint Electron Device Engineering Council) standard, the minimum memory refresh period is set to 64 ms, that means that each row of the DRAM has to be refreshed every 64 ms or less to keep its value.

In some embodiments, the processing unit 133 may be configured to determine a machine signature by:

determining, in association with each of the at least one machine characterization instruction executed by the one or more processors 111 for each of at least two machine configurations, a mean value and a dispersion value, the mean value representing the mean of the set of timing measurements associated with the at least one machine characterization instruction, the dispersion value representing a statistical dispersion of the set of timing measurements associated with the at least one machine characterization instruction;

determining, in association with each of the at least one machine characterization instruction, a difference of means value and a difference of dispersions value, the difference of means value representing the difference between the mean values determined for the at least two machine configurations, the difference of dispersions value representing the difference between the dispersion values determined for the at least two machine configurations;

determining a machine signature as a binary representation of the mean value, the dispersion value, the difference of means value, and the difference of dispersions value associated with the at least one machine characterization instruction.

The sets of timing measurements may be loaded from the processor's time stamp counter for example by executing a Read Time Stamp Counter (RDTSC) instruction or a Read from Model Specific Register (RDMSR) instruction for reading the content of the time-stamp counter or Read from a Performance Monitor Counter (RDPMC). The RDTSC, RDMSR, and RDPMC instructions are specific instructions for x86 processors. A Performance Monitor Counter is a counter that may be configured to count how many time a certain event occurs.

According to some embodiments, a dispersion value may be one of a variance or a standard deviation, or an inter-quartile range.

In some embodiments, the machine characterization parameter may be chosen in a group consisting of a number of processors, a number of cores, a main memory type, a cache memory type, a number of cache levels, a main memory size, a cache memory size, and a processor type/family model.

The machine characterization parameters specify hardware specifications of the computing device 11 and the type of the computing device 11, such parameters vary from one machine to another and affect the time required to access memory means and execute instructions. Further, the access time to the processor cache 113 depends on the cache level from which data/instructions is accessed. For example, for the Intel Core i7 processors, a level 1 cache hit lasts 4 clock cycles, a level 2 cache hit lasts 10 clocks cycles, a level 3 cache hit lasts 40 clock cycles, and a level 3 cache hit in another core lasts 65 clock cycles. Still for the Intel Core i7 processors, a DRAM main memory access requires 60 ns, several times slower than the cache hits.

The main memory type may be chosen in a group consisting of volatile memories and non-volatile memories.

Volatile memories may comprise a random access memory (RAM), a static random access memory (SRAM), a dynamic random access memory, a synchronous dynamic random access memory, a double data rate synchronous dynamic random access memory (DDR-SDRAM), a thyristor random access memory (T-RAM), and a zero capacitor random access memory (Z-RAM).

Non-volatile memories may comprise a read only memory (ROM), a programmable read only memory, an erasable programmable read only memory, an electrically erasable programmable read only memory, a non-volatile random access memory, a magnetic random access memory, and a Ferro-electric random access memory.

The processor type/family model may be chosen in a group comprising AMD™ Sempron processor, AMD Athlon 64 processor, AMD Athlon 64×2 processor, AMD A series processor, Intel™ Atom processor, Intel Itanium processor, Intel Xeon processor, Intel core i3 processor, Intel core i5 processor, Intel core i7 processor, and Intel Pentium Dual core processor.

For example, AMD A4 processors comprise two cores. AMD A6 processors comprise two cores. AMD A8 processors comprise four cores. AMD A10 processors comprise cores.

In some embodiments, the processing unit 133 may be configured to determine one or more machine characterization parameters online depending on the determined machine signature with respect to a set of predefined machines signatures previously determined offline. Each predefined machine signature may be associated with one or more predefined machine characterization parameters and may be saved in databases of machine signatures used for the purpose of machine type detection.

Alternatively, the processing unit 133 may be configured to determine one or more machine characterization parameters periodically or at specific time periods from machine characterization parameters previously determined during an initialization phase or a machine learning phase from the execution of at least one machine characterization instruction for at least two machine configurations.

In some embodiments, the machine characterization device 13 may be implemented within the computing device 11.

In some applications of the disclosure such as for example in virtual or cloud computing areas, the machine characterization device 13 and the computing device 11 may be remote, the computing device 11 being a cloud computing device, hosted in a cloud computing platform.

The machine characterization device 13 according to the embodiments of the invention may be used in different applications. In one application, the machine characterization device 13 may be used for example to ensure that the computing device 11 has not been internally modified. The disclosed solution may also be used in a cloud context, in order to check whether the machine that one is using, matches a subscribed configuration. In a cloud context, the invention could also be used for determining the localization of the computing device 11 in the case of physical computers located in different locations according their configuration. The invention can also be advantageously used to ensure that a given program is not running on an undesirable machine that can be insecure or not located in the right place/country. In such application of the invention, the machine characterization device 13 guarantees that the machine that one is using is the best one in terms of quality of service.

There is also provided a method for determining one or more machine characterization parameters of a computing device 11, the computing device 11 comprising one or more processors 111, each processor being configured to execute one or more instructions. The method comprises determining one or more machine characterization parameters from sets of timing measurements acquired for measuring the time of execution of at least one machine characterization instruction for at least two machine configurations, each machine configuration comprising at least two configuration instructions.

Figure 2:
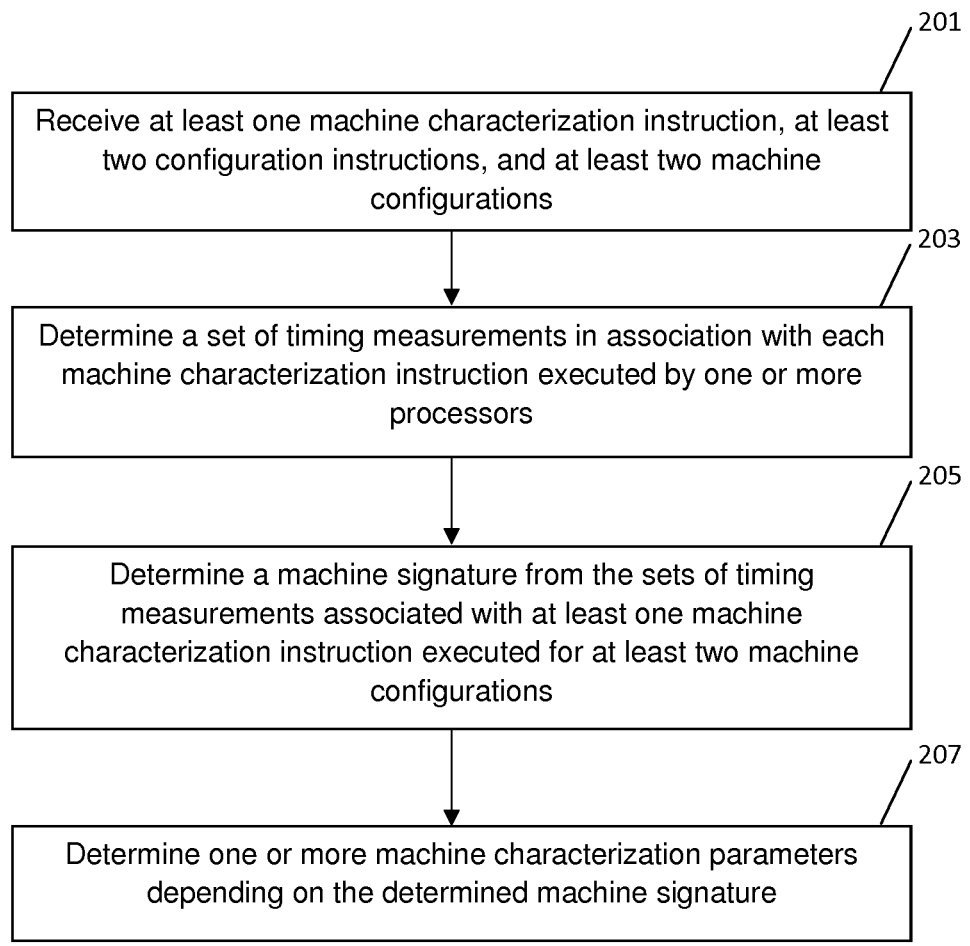
FIG. 2 is a flowchart illustrating a method for machine type detection, according to some embodiments of the invention.

FIG. 2 is a flowchart depicting the method for determining one or more machine characterization parameters according to some embodiments.

At step 201, at least one machine characterization instruction, at least two configuration instructions, and at least two machine configurations may be received. A machine characterization instruction is an assembly instruction associated with a timer for measuring the time of execution of the machine characterization instruction. A machine configuration comprises a sequence of two or more configuration instructions and defines a specific order of execution of the one or more instructions by the one or more processors 111.

At step 203, a set of timing measurements may be determined in association with each machine characterization instruction executed by the one or more processors 111, the set of timing measurements measuring, using the timer associated with each machine characterization instruction, the time of execution of the machine characterization instruction.

At step 205, a machine signature may be determined from the sets of timing measurements associated with at least one machine characterization instruction executed for each of the at least two machine configurations.

At step 209, one or more machine characterization parameters may be determined depending on the determined machine signature.

The method described herein can be implemented by computer program instructions supplied to the processor of any type of computer to produce a machine with a processor that executes the instructions to implement the functions/acts specified herein. These computer program instructions may also be stored in a computer-readable medium that can direct a computer to function in a particular manner. To that end, the computer program instructions may be loaded onto a computer to cause the performance of a series of operational steps and thereby produce a computer implemented process such that the executed instructions provide processes for implementing the functions specified herein.

While embodiments of the invention have been illustrated by a description of various examples, and while these embodiments have been described in considerable details, it is not the intent of the applicant to restrict or in any way limit the scope of the appended claims to such embodiments. Some of those embodiments may be advantageously combined, when appropriate. Additional advantages and modifications will readily appear to those skilled in the art. The invention in its broader aspects is therefore not limited to the specific details, representative methods, and illustrative examples shown and described.

The invention claimed is:

1. A machine characterization device for determining one or more hardware specification parameters of a computing device, said computing device comprising one or more processors, each processor being configured to execute one or more instructions, wherein the machine characterization device comprises:
   a storage unit configured to store at least one machine characterization instruction and at least two machine configurations, a machine characterization instruction being an instruction associated with a timer for measuring the time of execution of said machine characterization instruction, a machine configuration comprising a sequence of two or more machine configuration instructions defining an order of execution of the one or more instructions by said each processor, and
   a processing unit configured to:
      determine, in association with each machine characterization instruction executed by said one or more processors, a set of timing measurements measuring, using said timer, the time of execution of said machine characterization instruction;
      determine, from each set of timing measurements, a mean value, a dispersion value, a difference of means value, and a difference of dispersions value;
      determine a machine signature as a binary representation of said mean value, said dispersion value, said difference of means value, and said difference of dispersion value, said mean value being the mean of the set of timing measurements associated with said at least one machine characterization instruction, said dispersion value being a statistical dispersion of said set of timing measurements, said difference of means values being the difference between the mean values determined for said at least two machine configurations, said difference of dispersions values being the difference between the dispersion values determined for said at least two machine configurations, and
      determine said one or more hardware specification parameters depending on said machine signature.

2. The machine characterization device of claim 1, wherein a machine configuration instruction is chosen in a group consisting in memory barriers instructions and serialization instructions, a memory barrier instruction being one of a load barrier instruction or a store barrier instruction or a full barrier.

3. The machine characterization device of claim 1, wherein the computing device further comprises a main memory and at least one processor cache, said main memory and said at least one processor cache being configured to store data and/or instructions, a machine characterization instruction being chosen in a group consisting in a data cache read instruction for reading data from said at least one processor cache, an instruction cache read instruction for reading one or more instructions from said at least one processor cache, a data cache write instruction for writing data on said at least one processor cache, a cache suppress instruction for suppressing at least a part of data and/or instructions stored in said at least one processor cache, and a main memory write instruction for writing data on said main memory.

4. The machine characterization device of claim 3, wherein said main memory is a dynamic random access memory, a machine characterization instruction being an instruction that provides a minimum memory refresh period, a memory refresh operation consisting in reading information from at least a part of the main memory and rewriting the read information to said at least a part of main memory without modification of said information, a memory refresh period representing a time period between each two memory refresh operations.

5. The machine characterization device of claim 3, wherein a main memory type is chosen in a group consisting in volatile memories and non-volatile memories, volatile memories comprising a random access memory, a static random access memory, a dynamic random access memory, a synchronous dynamic random access memory, a double data rate synchronous dynamic random access memory, a thyristor random access memory, and a zero capacitor random access memory, non-volatile memories comprising a read only memory, a programmable read only memory, an erasable programmable read only memory, an electrically erasable programmable read only memory, a non-volatile random access memory, a magnetic random access memory, and a Ferro-electric random access memory.

6. The machine characterization device of claim 1, wherein a hardware specification parameter is chosen in a group consisting in a number of processors, a number of cores, a main memory type, a cache memory type, a number of cache levels, a main memory size, a cache memory size, and a processor type/family model.

7. The machine characterization device of claim 1, wherein a processor type/model is chosen in a group consisting in AMD Sempron processor, AMD Athlon 64 processor, AMD Athlon 64x2 processor, AMD A series processor, Intel Atom processor, Intel Itanium processor, Intel Xeon processor, Intel core i3 processor, Intel core i5 processor, Intel core i7 processor, Intel Pentium 4 processor, Intel Pentium D processor, and Intel Pentium Dual core processor.

8. The machine characterization device of claim 1, wherein the processing unit is configured to determine said one or more hardware specification parameters (online) depending on said machine signature with respect to a set of predefined machines signatures (previously determined offline), each predefined machine signature being associated with one or more predefined hardware specification parameters.

9. The machine characterization device of claim 1, wherein the processing unit is configured to determine said one or more hardware specification parameters periodically or at specific time from hardware specification parameters previously determined during a machine learning phase from the execution of at least one machine characterization instruction for at least two machine configurations.

10. The machine characterization device of claim 1, wherein the machine characterization device is implemented within the computing device.

11. The machine characterization device of claim 1, wherein the machine characterization device and the computing device are remote, the computing device being a cloud computing device hosted in a cloud computing platform.

12. A method for determining one or more hardware specification parameters of a computing device, said computing device comprising one or more processors, each processor being configured to execute one or more instructions, wherein the method comprises:
receiving at least one machine characterization instruction and at least two machine configurations, a machine characterization instruction being an instruction associated with a timer for measuring the time of execution of said machine characterization instruction, a machine configuration comprising a sequence of two or more machine configuration instructions defining an order of execution of said one or more instructions;
determining, in association with each machine characterization instruction executed by said one or more processors, a set of timing measurements measuring, using said timer, the time of execution of said machine characterization instruction;
determining, from each set of timing measurements, a mean value, a dispersion value, a difference of means value, and a difference of dispersions value;
determining a machine signature as a binary representation of said mean value, said dispersion value, said difference of means value, and said difference of dispersion value, said mean value being the mean of the set of timing measurements associated with said at least one machine characterization instruction, said dispersion value being a statistical dispersion of said set of timing measurements, said difference of means values being the difference between the mean values determined for said at least two machine configurations, said difference of dispersions values being the difference between the dispersion values determined for said at least two machine configurations, and
determining said one or more hardware specification parameters depending on said machine signature.

* * * * *